US011790500B2

(12) United States Patent
Kim et al.

(10) Patent No.: US 11,790,500 B2
(45) Date of Patent: Oct. 17, 2023

(54) METHOD AND APPARATUS FOR INVERSE TONE MAPPING

(71) Applicant: KOREA ADVANCED INSTITUTE OF SCIENCE AND TECHNOLOGY, Daejeon (KR)

(72) Inventors: Mun Churl Kim, Daejeon (KR); Soo Ye Kim, Daejeon (KR); Dae Eun Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 72 days.

(21) Appl. No.: 17/482,433

(22) Filed: Sep. 23, 2021

(65) Prior Publication Data
US 2022/0012855 A1    Jan. 13, 2022

Related U.S. Application Data

(62) Division of application No. 16/769,576, filed as application No. PCT/KR2017/014265 on Dec. 6, 2017, now abandoned.

(51) Int. Cl.
*G06T 5/00* (2006.01)
*G06F 17/11* (2006.01)
(Continued)

(52) U.S. Cl.
CPC .............. *G06T 5/009* (2013.01); *G06F 17/11* (2013.01); *G06N 3/02* (2013.01); *G06N 3/08* (2013.01);
(Continued)

(58) Field of Classification Search
CPC . G06T 2207/20208; G06T 2207/20084; G06T 2207/20081; G06T 5/009;
(Continued)

(56) References Cited

U.S. PATENT DOCUMENTS

2018/0241929 A1\* 8/2018 Bouzaraa ............... G06K 9/627
2018/0359416 A1\* 12/2018 Hold-Geoffroy ..... G06T 15/506
(Continued)

OTHER PUBLICATIONS

K. He, J. Sun and X. Tang, "Guided Image Filtering," in IEEE Transactions on Pattern Analysis and Machine Intelligence, vol. 35, No. 6, pp. 1397-1409, Jun. 2013, doi: 10.1109/TPAMI.2012.213.\*
(Continued)

*Primary Examiner* — Li Liu
(74) *Attorney, Agent, or Firm* — JCIPRNET

(57) ABSTRACT

In this invention, we propose a convolutional neural network (CNN) based architecture designed for the ITM to HDR consumer displays, called ITM-CNN, and its training strategy for enhancing the performance based on image decomposition using the guided filter. We demonstrate the benefits of decomposing the image by experimenting with various architectures and also compare the performance for different training strategies. To the best of our knowledge, this invention first presents the ITM problem using CNNs for HDR consumer displays, where the network is trained to restore lost details and local contrast. Our ITM-CNN can readily up-convert LDR images for direct viewing on an HDR consumer medium, and is a very powerful means to solve the lack of HDR video contents with legacy LDR videos.

16 Claims, 6 Drawing Sheets

LDR image      (a) Base layer      (b) Detail layer

(51) Int. Cl.
*G06N 3/02* (2006.01)
*G06N 3/08* (2023.01)
*G06T 5/50* (2006.01)

(52) U.S. Cl.
CPC ...... *G06T 5/50* (2013.01); *G06T 2207/10016* (2013.01); *G06T 2207/10024* (2013.01); *G06T 2207/20081* (2013.01); *G06T 2207/20084* (2013.01); *G06T 2207/20208* (2013.01)

(58) Field of Classification Search
CPC ........... G06T 5/007; G06T 2207/20221; G06T 7/337; G06T 9/002; G06N 3/08; G06N 3/02; G06N 3/0454; G06K 9/627; G06V 10/82; G06V 10/454
See application file for complete search history.

(56) References Cited

U.S. PATENT DOCUMENTS

| | | | | |
|---|---|---|---|---|
| 2019/0080440 | A1* | 3/2019 | Eriksson | G06T 5/008 |
| 2019/0096046 | A1* | 3/2019 | Kalantari | G06T 5/008 |
| 2020/0134787 | A1* | 4/2020 | Bouzaraa | G06T 5/50 |

OTHER PUBLICATIONS

Eilertsen, Gabriel, et al. "HDR image reconstruction from a single exposure using deep CNNs." ACM transactions on graphics (TOG) 36.6 (2017): 1-15.*
Endo, Yuki, Yoshihiro Kanamori, and Jun Mitani. "Deep reverse tone mapping." ACM Trans. Graph. 36.6 (2017): 177-1.*

* cited by examiner

METHOD AND APPARATUS FOR INVERSE TONE MAPPING

CROSS REFERENCE TO RELATED APPLICATION

This application is a divisional application of and claims the priority benefit of prior application Ser. No. 16/769,576, filed on 2020 Jun. 3. The prior application Ser. No. 16/769,576 is a 371 application of the International PCT application serial no. PCT/KR2017/014265, filed on Dec. 6, 2017. The entirety of each of the above-mentioned patent applications is hereby incorporated by reference herein and made a part of specification.

TECHNICAL FIELD

At least one example embodiment relates to a method for inverse tone mapping and apparatuses performing the method.

Background Art

The human visual system perceives the world as much brighter, with stronger contrasts and more details than is typically presented in standard dynamic range (SDR) displays. In comparison, recently available high dynamic range (HDR) consumer displays allow users to enjoy videos closer to reality as seen by the naked eye, with the brightness of at least 1,000 cd/m2 (as opposed to 100 cd/m2 for SDR displays), higher contrast ratio, increased bit depth of 10 bits or more, and wide color gamut (WCG). However, although HDR TVs are readily available in the market, there is a severe lack of HDR contents.

Inverse tone mapping (ITM), also referred to as reverse tone mapping, is a popular area of research in computer graphics that aims to predict HDR images from low dynamic range (LDR) images for better graphics rendering. Another field of research, HDR imaging, makes use of multiple LDR images of different exposures to create a single HDR image that contains details in the saturated regions. In the above two fields of research, the lighting calculations are conducted in the HDR domain with the belief that this would yield a more accurate representation of the graphic or natural scene on an SDR display. The HDR images are viewed on professional HDR monitors during rendering. Consequently, the HDR domain referred to in the above areas are not necessarily the same as the now available HDR consumer displays, and the resulting HDR images by the ITM methods for such purposes are not suitable for direct viewing on an HDR TV. When the conventional ITM methods are applied for an HDR TV with the maximum brightness of 1,000 cd/m2, they are not capable of fully utilizing the available HDR capacity due to their weakness in generating full contrast or/and details, or due to noise amplification as seen in FIG. 1. (Note that they are tone mapped for viewing.)

DISCLOSURE OF INVENTION

Technical Problem

When the conventional ITM methods are applied for an HDR TV with the maximum brightness of 1,000 cd/m2, they are not capable of fully utilizing the available HDR capacity due to their weakness in generating full contrast or/and details, or due to noise amplification.

Solution to Problem

Therefore, we formulate a slightly different problem where we aim to generate HDR images that can be directly viewed on commercial HDR TVs. In this way, LDR legacy videos may be up-converted to be viewed on available HDR displays without additional information required. We propose an effective convolutional neural network (CNN) based structure and its learning strategy for up-converting a single LDR image of 8 bits/pixel, gamma-corrected [20], in the BT.709 color container [25], to an HDR image of 10 bits/pixel through the perceptual quantization (PQ) transfer function [27] in the BT.2020 color container [26], that may be directly viewed with commercial HDR TVs.

BRIEF DESCRIPTION OF DRAWINGS

These and/or other aspects will become apparent and more readily appreciated from the following description of example embodiments, taken in conjunction with the accompanying drawings of which.

MODE FOR THE INVENTION

Figure 1:
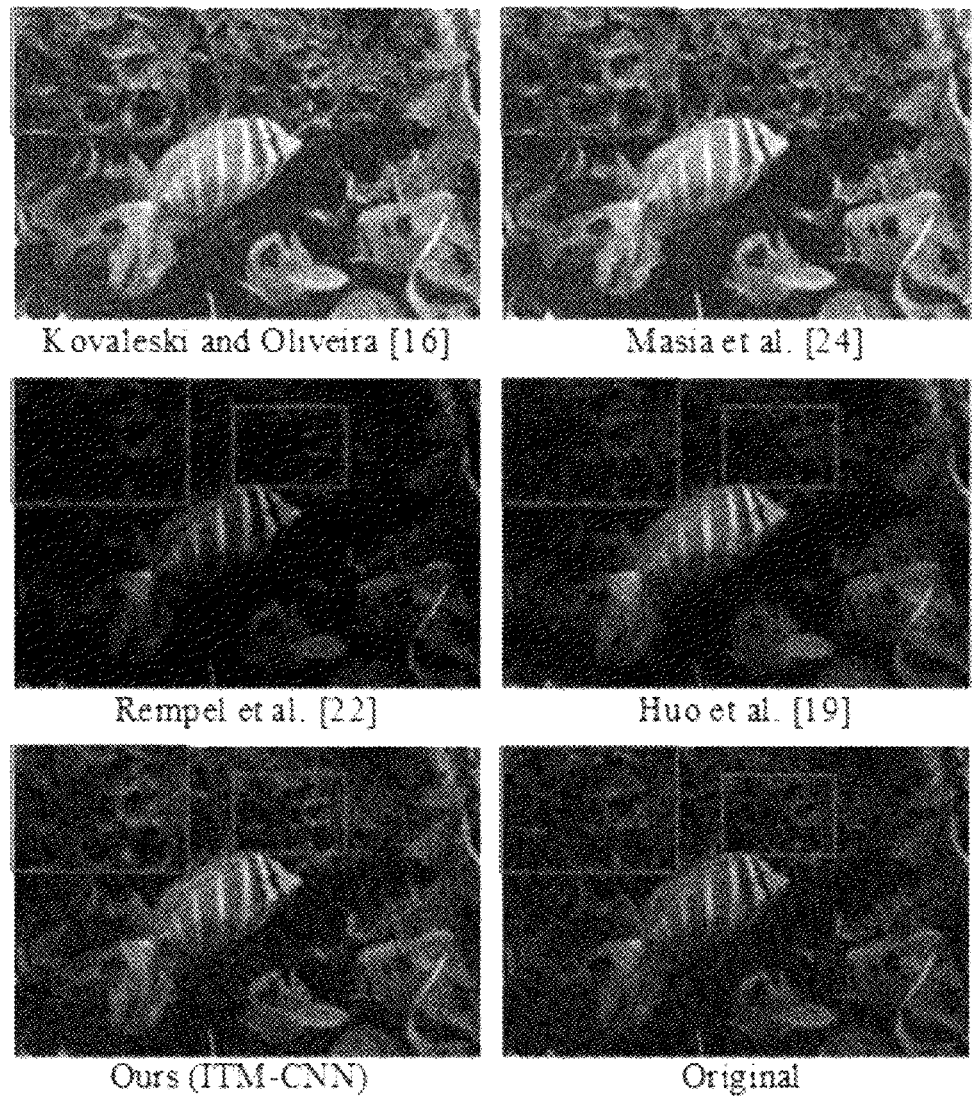
FIG. 1 is a diagram illustrating conventional ITM Methods.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to limit the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In addition, terms such as first, second, A, B, (a), (b), and the like may be used herein to describe components. Each of these terminologies is not used to define an essence, order or sequence of a corresponding component but used merely to distinguish the corresponding component from other component(s).

It should be noted that if it is described in the disclosure that one component is "connected," "coupled," or "joined" to another component, a third component may be "connected," "coupled," and "joined" between the first and second components, although the first component may be directly connected, coupled or joined to the second component.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all teens including technical and scientific terms used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Various example embodiments will now be described more fully with reference to the accompanying drawings in which some example embodiments are shown. In the drawings, the thicknesses of layers and regions are exaggerated for clarity.

We propose the first CNN architecture, called ITM-CNN, for the ITM problem to readily available HDR consumer displays.

Our architecture is a fully end-to-end CNN that is able to jointly optimize the LDR decomposition and HDR reconstruction phases.

This allows all legacy LDR images/video to be up-converted for direct viewing on HDR TVs.

2. Related Work

Tone mapping is a popular problem dealt in computer graphics and image processing. When graphics are rendered in the HDR domain for better representation of the scenes which have near-continuous brightness and high contrast in the real world, they have to be tone mapped somehow to the displayable range. ITM came later, to transfer the LDR domain images to the HDR domain. The term itself was first used by Banterle et al. in [14]. The previous ITM methods mainly focus on generating the expand map and revealing contrast in saturated regions. In this section, previous methods regarding ITM to the HDR domain will be reviewed. It should be noted that we address a slightly different problem in this invention than the previous methods, where our final goal is not viewing HDR rendered tone mapped images on SDR displays, nor viewing HDR images on a professional HDR monitor, but viewing generated HDR images directly on consumer HDR displays (e.g., HDR TVs).

ITM was first introduced by [14, 17], where Banterle et al. formulated the inverse of Reinhard's tone mapping operator [18]. In addition to the inverse of the tone mapping operator, they also proposed an expand map, which specifies the amount of expansion for every pixel position. Two main purposes of the expand map is to reduce contouring artifacts resulting from quantization and to expand the bright regions in the LDR images. Similarly, Rempel et al. proposed a brightness enhancement function in [22]. The brightness enhancement function is derived from the blurred mask that indicates saturated pixel areas. With the edge stopping filter, the brightness enhancement function preserves edges with high contrast. Another related approach is [15, 16] where Kovaleski and Oliveira used a bilateral grid to make an edge-preserving expand map.

There are also methods that find a global mapping function of the whole image instead of a pixel-wise mapping. In [21], Meylan et al. applied linear expansions with two different slopes depending on whether the pixel is classified as the diffuse region or the specular region. Pixels with values greater than a predefined threshold are classified into the specular region and all other pixels are classified into the diffuse region. The specular region is expanded with a steeper function than the diffuse region. The ITM algorithms presented above mainly classify pixels into two classes: pixels to be expanded more and pixels to be expanded less. Usually, the pixels in the bright regions tend to be expanded more.

Another method that investigates a global mapping function is [23]. In [23], Masia et al. evaluated a number of ITM algorithms and found that the performance of the algorithms decreased for overexposed input images. Based on this observation, they proposed an ITM curve based on the gamma curve, where the parameter gamma is a function of the statistics of the input image. Their following work [24] improves upon their previous work with a robust multilinear regression model. In [19], Huo et al. proposed an ITM algorithm imitating the characteristics of the human visual system and its retina response. This ITM algorithm enhances local contrast.

Recently, CNN-based structures have shown exceptional performance in modelling images to find a non-linear mapping, especially for classification problems [11] or regression problems [12, 13]. There are very few ITM methods based on CNNs. One of them, proposed by Endo et al. [7] is an indirect approach where they use a combination of 2D and 3D CNNs to generate multiple LDR images (bracketed images) of different exposures from a single LDR image, and merge these bracketed images using the existing methods to obtain a final tone mapped HDR image. Kalantari et al. [8] proposed an HDR imaging method where they used a CNN for integrating the given multipleLDR images of different exposures to generate an HDR image which is tone mapped for viewing. Eilertsen et al. [9] and Zhang et al. [10] proposed encoder-decoder-based networks for HDR reconstruction which is also tone mapped for viewing.

However, the previous methods share an ultimate step of tone mapping the HDR-rendered images where the HDR domain referred to in their papers are that to be viewed on professional HDR monitors for rendering operations. Consequently, they have not considered transfer functions such as PQ-EOTF [27, 28] or Hybrid Log Gamma [28] and color containers related to SDR or HDR format. Even when the transfer function and the color container are converted manually, HDR images converted by the previous methods are not suitable for viewing on consumer HDR displays. In this invention, we propose an ITM method with ITM-CNN, by which the resulting HDR images can be directly viewed on commercial HDR TVs. The end-to-end CNN-based structure of our ITM-CNN benefits from image decomposition along with delicate training strategies.

3. Proposed Method

Our proposed ITM-CNN has an end-to-end CNN structure for the prediction of the HDR image from a single LDR image.

3.1 Network Architecture

In tone mapping, edge-preserving filters (e.g. bilateral filter) are frequently used on the HDR input to decompose the image into the base layer and detail layer so that only the base layer is compressed while preserving the detail layer.

Figure 2:
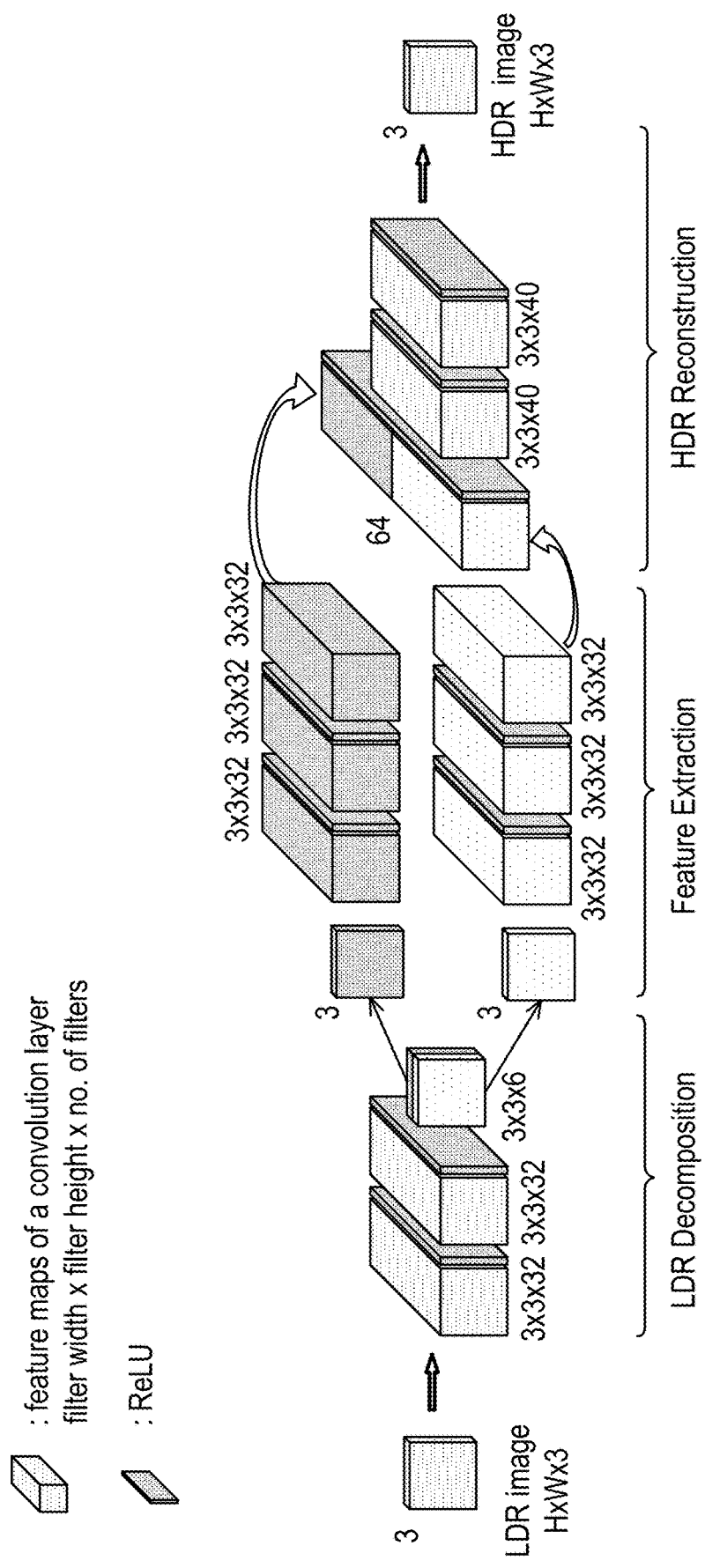
FIG. 2 is a diagram illustrating the architecture of our ITM-CNN.

The processed base and detail layers are then integrated to obtain a final LDR output image. In contrast, the purpose of an ITM algorithm is to predict lost details with an extended base layer to match the desired brightness to finally generate the output HDR image. If the image is decomposed into two parts with different characteristics, appropriate processing may be done for the individual branches for a more accurate prediction of the output image. Following from this idea, we explicitly model our CNN structure (ITM-CNN) as three parts: (i) LDR decomposition, (ii) feature extraction and (iii) HDR reconstruction, as illustrated in FIG. 2.

The first part of our ITM-CNN, LDR decomposition, consists of three convolution layers where the number of output channels for the last layer is six, intended to decompose each LDR input image into two different sets of feature maps, simply divided as the first three and the last three feature maps. Then, the convolution layers in the feature extraction part proceed individually for the two sets so that each of the two CNN branches are able to focus on the characteristics of the respective inputs for specialized feature extraction. Lastly, for HDR reconstruction, the extracted feature maps from the individual passes are concatenated and the network (HDR reconstruction part) learns to integrate the feature maps from the two passes to finally generate an HDR image. Our ITM-CNN jointly optimizes all the three steps of LDR decomposition, feature extraction and HDR reconstruction, but has to be trained delicately to fully benefit from the image filtering idea (decomposition of LDR input).

3.2 Training Strategy

Figure 3:
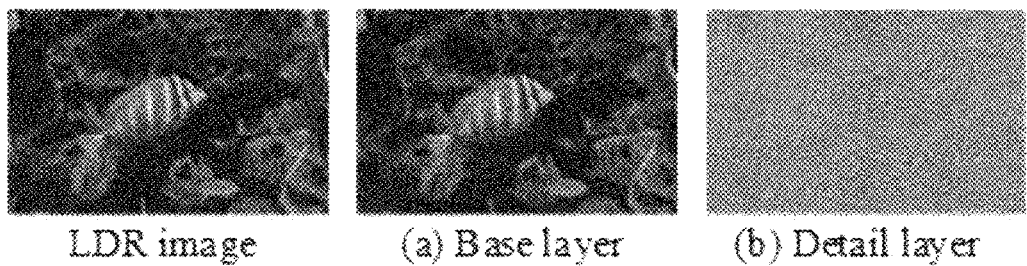
FIG. 3 are images decomposed using a guided filter.
Figure 4:
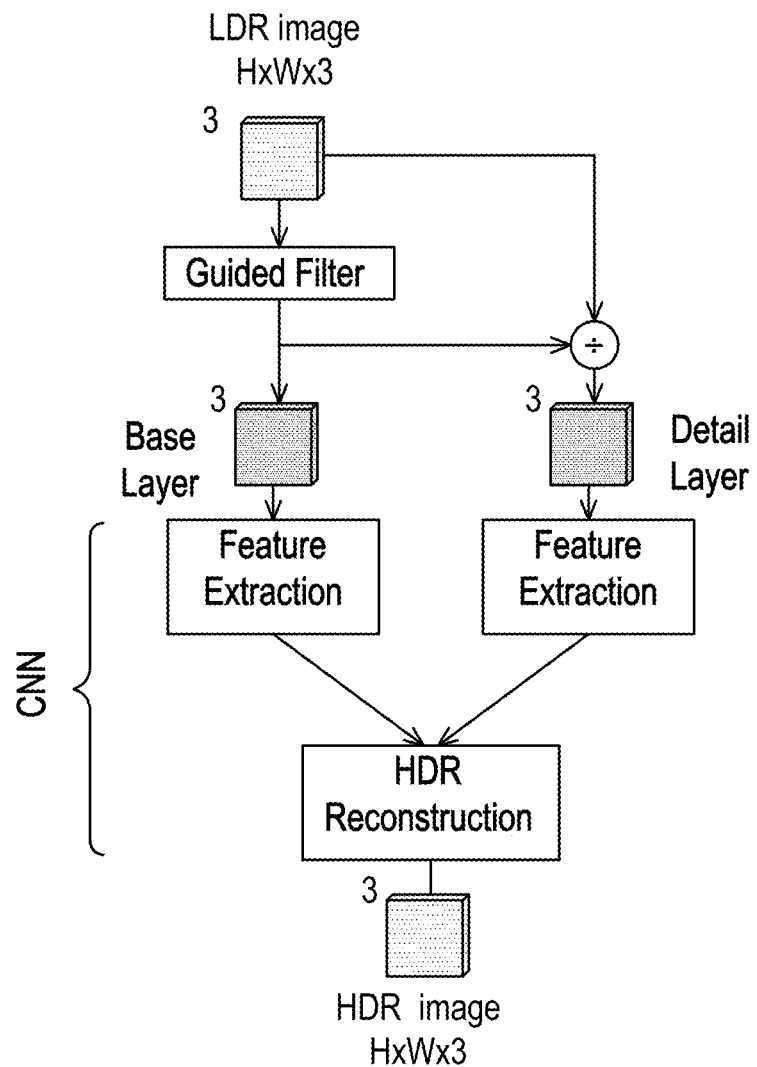
FIG. 4 is a diagram illustrating the pre-train structure.

First, we pre-train the feature extraction and HDR reconstruction parts of the ITM-CNN after setting the LDR decomposition part as a guided-filtering-based separation of the base and detail layers for the LDR input. The pre-training structure of the ITM-CNN is illustrated in FIG. 4. The guided filter [1, 2] is an edge-preserving filter that does not suffer from gradient reversal artifacts like the bilateral filter [3]. The base layer is extracted using the self-guided filter as suggested in [1, 2], and the detail layer is obtained by element-wise division of the input LDR image by the base layer, given as $$I_{detail} = I_{LDR} \oslash I_{base} \quad (1)$$

where $I_{LDR}$ is the LDR input, $I_{detail}$ is the detail layer and $I_{base}$ is the base layer. $\oslash$ in (1) denotes an element-wise division operator. An example of an image separated using the guided filter is given in FIG. 3.

After pre-training the feature extraction and HDR reconstruction parts using the pre-train structure with guided-filtering-separation, the guided filter is replaced with three convolution layers (LDR decomposition part in FIG. 2) allowing for the final fully convolutional architecture as given in FIG. 2. We pre-train the three layers in the new LDR decomposition part with the same data but without updating the weights of later layers by setting the learning rate to zero for those layers, so that the convolution layers learn to decompose the LDR input image into feature maps that lower the final loss, while utilizing the weights in later layers that were trained with guided filter separation. When the pre-training is finished, the network (ITM-CNN) is finally trained end-to-end for joint optimization of all three parts. We observed a significant increase in performance by using this pre-training strategy.

4. Experiments

4.1 Experiment Conditions

4.1.1 Data

We collected 7,268 frames of 3840×2160 UHD resolution of the LDR-HDR data pairs containing diverse scenes. The specifications are given in Table 1. The HDR video is professionally filmed and mastered, and both the LDR and HDR data are normalized to be in the range [0, 1]. For the synthesis of training data, we randomly cropped 20 subimages of size 40×40 per frame with the frame stride of 30. This resulted in the total training data of size 40×40×3×4, 860. For testing, we selected 14 frames from six different scenes that are not included in the training set. All videos were converted to the YUV color space and all three YUV channels were used for training. Although it is common to use Y channel only, using all three channels is more reasonable for our ITM problem since the color container also changes from BT.709 [25] to BT.2020 [26]. The quantitative benefit of using all three channels is shown in Table 2 when experimenting with a simple CNN structure.

TABLE 1

| Data Type | Bit Depth | Transfer Function | Color Container |
|---|---|---|---|
| LDR | 8 bits/pixel | Gamma | BT. 709 |
| HDR | 10 bits/pixel | PQ-OETF | BT. 2020 |

TABLE 2

| Train Data | Y only | YUV |
|---|---|---|
| PSNR of Y (dB) | 44.36 | 46.36 |
| PSNR of YUV (dB) | 32.53 | 48.25 |

The large difference in the PSNR when measured for all three YUV channels is largely in part due to the color container and transfer function mismatch of LDR and HDR images if the U and V channels are not trained. Note that the Y channel benefits from the complementary information of U and V channels.

4.1.2 Training Parameters

The weight decay of the convolution filters was set to 5×10-4 with that of biases set to zero. The mini-batch size was 32 with the learning rate of 10-4 for filters and 10-5 for biases. All convolution filters are of size 3×3 and the weights were initialized with the Xavier initialization [4] that draws the weights from a normal distribution with the variance expressed with both the number of input and output neurons. The loss function of the network (ITM-CNN) is given by $$L(\theta) = \frac{1}{2n} \sum_{i=1}^{n} \|F(I_{LDR}; \theta) - I_{HDR}\|^2 \quad (2)$$

where $\theta$ is the set of model parameters, n is the number of training samples, $I_{LDR}$ is the input LDR image, F is the non-linear mapping function of the ITM-CNN giving the prediction of the network as $F(I_{LDR}; \theta)$, and $I_{HDR}$ is the ground truth HDR image. The activation function is the rectified linear unit (ReLU) [5] given by $$ReLU = \max(0, x) \quad (3)$$

All network models are implemented with the MatConvNet [6] package.

4. 2 Input Decomposition

Decomposing the LDR input lets the feature extraction layers to concentrate on each of the decompositions. Specifically, we use the guided filter [1, 2] for input decomposition. We compare three different architectures shown in FIG. 5 to observe the effect of decomposing the LDR input.

Figure 5A:
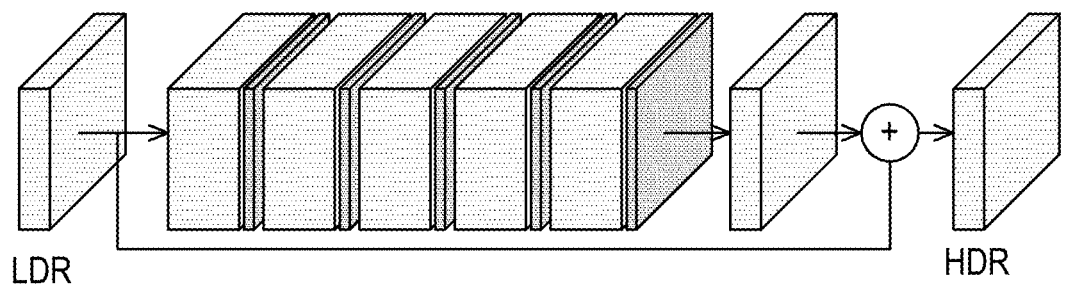
FIGS. 5a, 5b, and 5c are diagrams illustrating different architectures using image decompositions.

The first structure shown in FIG. 5a is a simple six-convolution-layer structure with residual learning. Since both the input LDR image with 8 bits/pixel and the ground truth HDR image with 10 bits/pixel are normalized to be in the range [0, 1], we can simply model the network (FIG. 5a) to learn the difference between the LDR and HDR image for a more accurate prediction. Although no decomposition is performed on the input LDR image, residual learning may be interpreted as an additive separation of the output that allows the CNN (FIG. 5a) to focus only on predicting the difference between LDR and HDR.

Figure 5B:
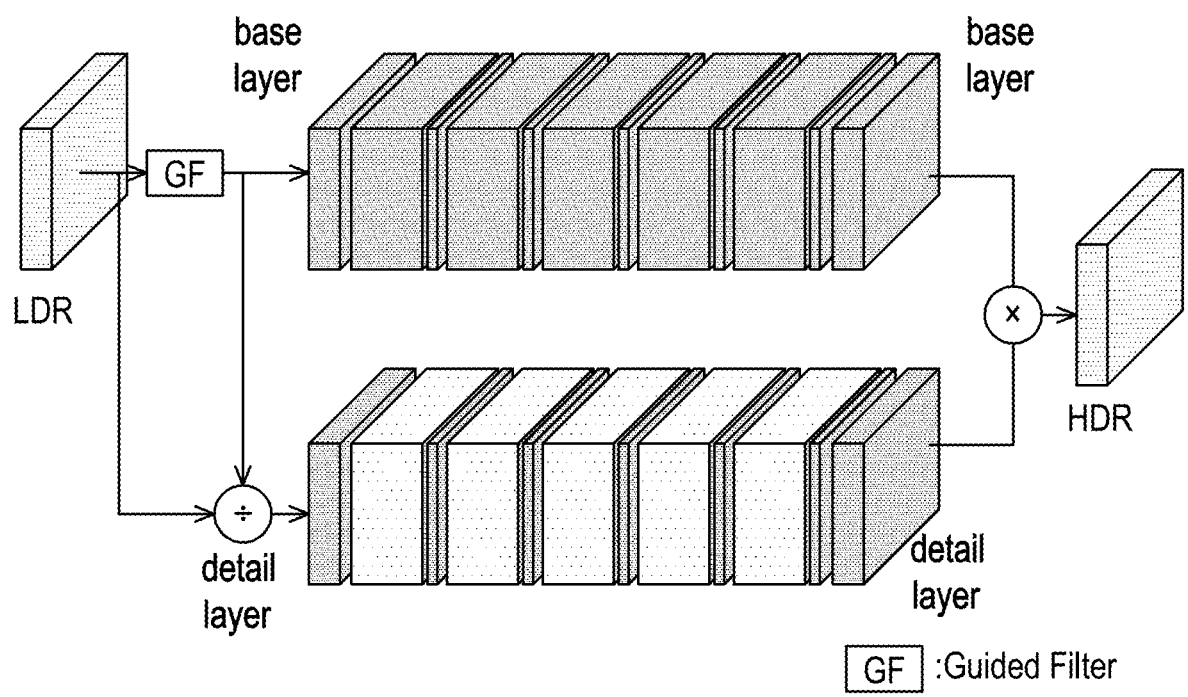

The second structure shown in FIG. 5b uses the guided filter for multiplicative input decomposition, and has two individual passes where one predicts the base layer and the other predicts the detail layer of the HDR image. The base and detail layer predictions are then multiplied element-wise to obtain the final HDR image. By providing the ground truth base and detail layers of the HDR image during training, this second structure can fully concentrate on the decompositions for the final prediction.

Figure 5C:
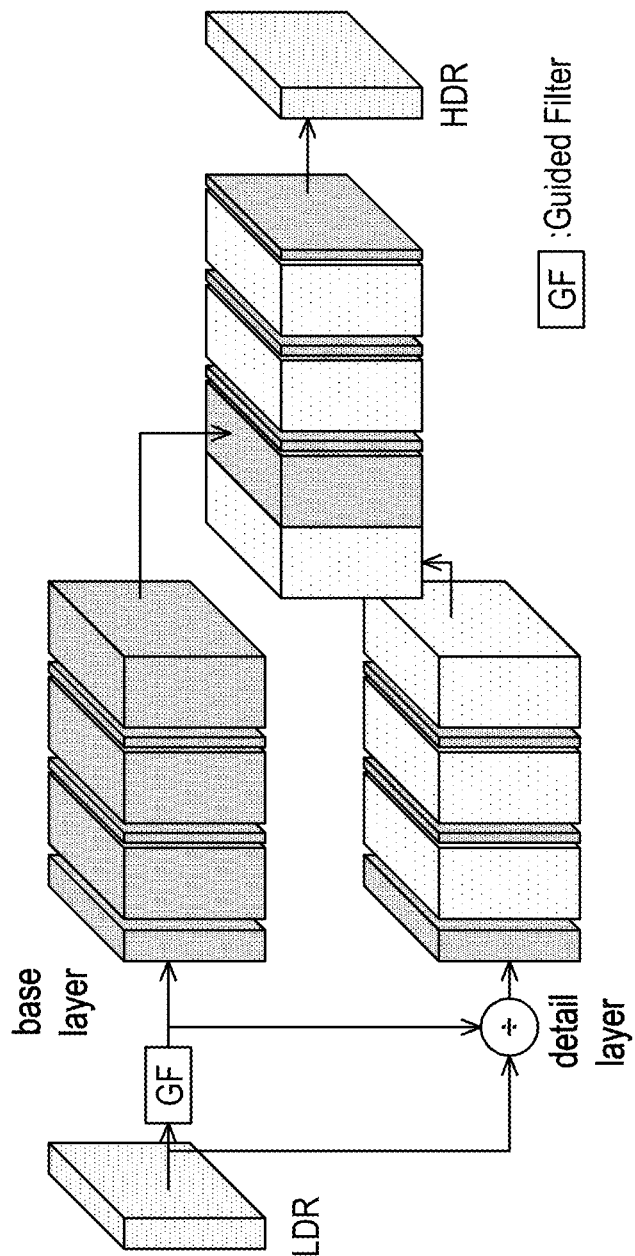

The last structure shown in FIG. 5c, also uses the guided filter for multiplicative input decomposition, but the feature maps from the individual passes are concatenated for direct prediction of the HDR image. This network learns the optimal integration operation that lowers the final loss through the last three convolutional layers, whereas for the structure in FIG. 5b, we explicitly force the network to model the base and detail layers of the HDR image for an element-wise multiplicative integration. Note that this last structure is the same as the pre-train structure in FIG. 4.

The results of the experiment are given in Table 3 where (a), (b) and (c) denote the structures illustrated in FIG. 5. For fair comparison, we tune the number of filters in the hidden layers so that the total number of parameters for each of the structures are similar. We perform two additional experiments with structure (a) and (c) denoted by (a)* and (c)* where (a)* is the structure (a) without residual learning, and (c)* is the structure (c) with element-wise multiplication instead of concatenation for integrating the feature maps after the third convolution layer. We compare the structures in terms of PSNR measured only for the Y channel and for all three YUV channels.

Even with similar number of parameters, there is a maximum PSNR difference of 0.67 dB measured for Y channel only and 0.48 dB measured for YUV channels depending on whether input decomposition is used or not and how the decomposed inputs are treated. The highest performing structure is the structure (c), although (c)* shows comparable results for PSNR measured for YUV, where the network has the freedom to learn the integration of two feature extraction passes. Comparing the structures (a) and (b), we confirm that the input decomposition using the guided filter is highly beneficial. Also, for the simple CNN architecture in the structure (a), it is crucial to use residual learning for improved prediction. Letting the convolution layers to focus on specific input decompositions with different characteristics, and learn to combine information generated by the different branches is important in reconstructing a high quality HDR image 4.3 Effect of Pre-Training We model a fully end-to-end CNN structure as illustrated in FIG. 2 by replacing the guided filter-based separation in the structure (c) with three convolutional layers each with 32 filters of size 3×3. However, we find that pre-training the network is essential to fully utilize the three parts of the network (LDR decomposition, feature extraction and HDR reconstruction) as intended. Table 4 shows the results of the same network, the fully convolutional network in FIG. 2, with different training procedures. The specified order n corresponding to each of the three parts in Table 4 indicate the training orders, where only the layers of a specific part are trained in the n-th order, and the weights of other layers remain fixed. When the feature extraction and HDR reconstruction parts are marked as being trained first (denoted as '1st' in columns 3, 4 and 5 of Table 4), the LDR decomposition part was replaced with the guided filter separation for the pre-training. The 'All' in row 5 of Table 4 indicates that all layers were trained, end-to-end.

If the whole network is simply trained end-to-end without any pre-training, it achieves 0.32 dB lower performance in PSNR of Y than the structure of FIG. 5c, even though it has three more convolution layers or 11,808 more filter parameters. However, if the pre-trained filter values (of FIG. 4 or 5c) using the guided filter separation (instead of the LDR decomposition layers) are used to initialize the network before the end-to-end training, the resulting PSNR performance jumps with 0.4 dB and 0.18 dB for Y and YUV respectively, thus exceeding the best performing version in Table 3.

The highest PSNR performance can be obtained by also pre-training the LDR decomposition layers in conjunction

TABLE 3

| Structure | (a)* | (a) | (b) | (c)* | (c) |
|---|---|---|---|---|---|
| Layer | | | Number of filter channels (input, output) | | |
| 1 | 3, 32 | 3, 32 | 3, 45 | 3, 32    3, 32 | 3, 32    3, 32 | 3, 32    3, 32 |
| 2 | 32, 32 | 32, 32 | 45, 45 | 32, 32    32, 32 | 32, 32    32, 32 | 32, 32    32, 32 |
| 3 | 32, 32 | 32, 32 | 45, 48 | 32, 32    32, 32 | 32, 32    32, 32 | 32, 32    32, 32 |
| 4 | 32, 32 | 32, 32 | 48, 45 | 32, 32    32, 32 | 32, 52 | 64, 40 |
| 5 | 32, 32 | 32, 32 | 45, 45 | 32, 32    32, 32 | 52, 48 | 40, 40 |
| 6 | 32, 3 | 32, 3 | 45, 3 | 32, 3    32, 3 | 48, 3 | 40, 3 |
| Total parameters | 38, 592 | 38, 592 | 77, 760 | 77, 184 | 77, 328 | 77, 112 |
| PSNR of Y | 45.46 | 46.36 | 46.36 | 46.84 | 46.73 | 47.03 |
| PSNR of YUV | 47.28 | 48.25 | 48.39 | 48.65 | 48.87 | 48.82 | with the pre-training by the guided filter separation network and the end-to-end training at the end.

TABLE 4

| Network Part | | Order of Training | | |
|---|---|---|---|---|
| LDR Decomposition | — | $2^{nd}$ | — | $2^{nd}$ |
| Feature Extraction | — | $1^{st}$ | $1^{st}$ | $1^{st}$ |
| HDR Reconstruction | — | | | |
| All | $1^{st}$ | — | $2^{nd}$ | $3^{rd}$ |
| PSNR of Y (dB) | 46.71 | 46.28 | 47.11 | 47.27 |
| PSNR of YUV (dB) | 48.80 | 48.15 | 48.98 | 49.21 |

TABLE 5

| Sequence | Banterle et al. [17] | Huo et at. [19] | Kovaleski et al. [16] | Masia et al. [24] | Meylan et al. [21] | Rempel et al. [22] | Ours (ITM-CNN) |
|---|---|---|---|---|---|---|---|
| Aquarium | 20.78 | 28.57 | 23.24 | 23.96 | 23.59 | 24.80 | 32.24 |
| Leaves | 19.53 | 29.47 | 23.48 | 19.64 | 23.05 | 25.13 | 29.95 |
| Cuisine | 17.47 | 28.73 | 21.51 | 22.24 | 22.01 | 24.79 | 31.07 |
| Average | 19.26 | 28.92 | 22.74 | 21.95 | 22.88 | 24.91 | 31.09 |

4.4 Comparisons with Conventional Methods

Since no previous method was explicitly trained for viewing with consumer HDR displays, fair comparison with our method is difficult. When comparing the previous ITM methods, we set the maximum brightness to 1,000 cd/m2, remove gamma correction and apply the expansion operator in the linear space. After the expansion, the color container is converted from BT. 709 to BT. 2020 and the PQ-EOTF transfer function is applied for pixel values to be in logarithmic space. Note that our method works directly in the logarithmic space without any conversion using the transfer function or color container.

Figure 6:
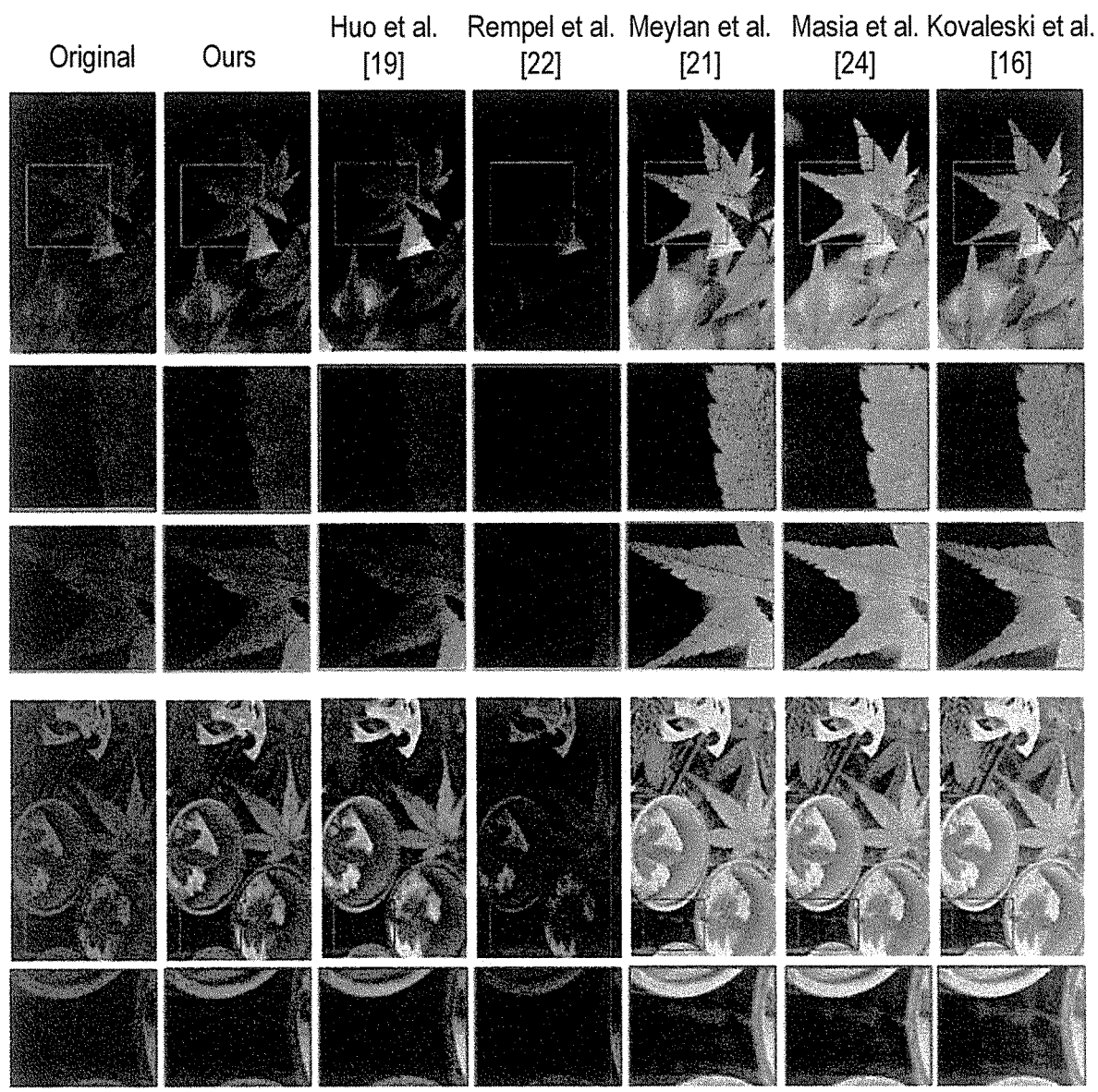
FIG. 6 is a diagram illustrating comparisons with previous methods.

Another complicatio s tone mapping for viewing on papers or SDR displays. All images in this invention were tone mapped using the madVR renderer using the MPC-HC player, heuristically found to be most similar as viewing with HDR consumer displays. Although this is not the exact application of our problem, the result images still support our approach to be valid, and show that the existing methods are not directly applicable for viewing on HDR consumer displays. The result images for subjective comparisons are given in FIG. 6. PSNR performance comparison is given in Table 5.

5. Conclusion

Despite that high-end HDR TVs are readily available in the market, HDR video contents are scarce. This entails the need for a means to up-convert LDR legacy video to HDR video for the high-end HDR TVs. Although existing ITM methods share a similar goal of up-converting, their ultimate objective is not to render the inversely-tone-mapped HDR images on consumer HDR TV displays, but to transfer the LDR scenes to the HDR domain for better graphics rendering on professional HDR monitors. The resulting HDR images from previous ITM methods exhibit noise amplification in dark regions and lack of local contrast or unnatural colors when being viewed on consumer HDR TV displays.

In this invention, we first present the ITM problem using CNNs for HDR consumer displays, where the network is trained to restore lost details and local contrast. For an accurate prediction of the HDR image, the different parts (LDR decomposition, feature extraction and HDR reconstruction) of our network must be trained separately prior to end-to-end training. Specifically, we adopt the guided filter for LDR decomposition for the pre-training stage so that the later layers can focus on the individual decompositions with separate passes. The HDR reconstruction part of ITM-CNN learns to integrate the feature maps from the two passes. The resulting HDR images are artifact-free, restore local contrast and details, and are closest to the ground truth HDR images when compared to previous ITM methods. ITM-CNN is readily applicable to legacy LDR videos for their direct viewing as HDR videos on consumer HDR TV displays.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. An image processing method, the method comprising:
receiving an image;
decomposing the image into two or more decomposed images by performing a decomposition operation;
extracting feature maps for the decomposed images by performing convolution operations for the decomposed images; and
generating a high dynamic range (HDR) image by processing the extracted feature maps, wherein decomposing the image into two or more decomposed images comprises:
applying a guided filter for the image; and
producing the two or more decomposed images as having different signal components, wherein producing the two or more decomposed images as having different signal components comprises
generating the two or more decomposed images comprising a first layer by performing an element-wise division on the image by one of the two or more decomposed images which comprises a second layer, wherein the second layer is extracted by applying the guided filter for the images, wherein the first layer and the second layer have different characteristics.

2. The method of claim 1, wherein decomposing the image into two or more decomposed images comprises:
performing convolutions for the image to yield the feature maps as input into two or more separate branches of convolution passes.

3. The method of claim 1, wherein generating an HDR image by processing the extracted feature maps comprises:
applying convolution operations on the extracted feature maps through one or more convolution layers.

4. The method of claim 1, wherein generating an HDR image by processing the extracted feature maps comprises:
multiplying outputs of different branches of convolution passes.

5. The method of claim 1, further comprising:
training filter parameters of the convolution operations for at least one of image decomposition, feature extraction and HDR image generation.

6. The method of claim 5, wherein training the filter parameters comprises:
updating the filter parameter values for the convolution operations based on one or more training loss functions.

7. The method of claim 6, wherein updating the filter parameter values for the convolution operations based on one or more training loss functions comprises:
changing the filter parameter values for the convolutions based on the difference signals between predicted HDR image and a ground truth HDR image.

8. The method of claim 1, wherein producing the two or more decomposed images as having different signal components comprises generating the two or more decomposed images by performing edge-preserving filtering on the image.

9. An image processing apparatus, the apparatus comprising:
a receiver configured to receive an image; and
a processor configured to decompose the image into two or more decomposed images by performing a decomposition operation, to extract feature maps by performing convolution operations through one or more convolution layers for the decomposed images, and to generate a high dynamic range (HDR) image by processing the extracted feature maps, wherein decomposing the image into two or more decomposed images comprises:
applying a guided filter for the image; and
producing the two or more decomposed images as having different signal components, wherein producing the two or more decomposed images as having different signal components comprises
generating the two or more decomposed images comprising a first layer by performing an element-wise division on the image by one of the two or more decomposed images which comprises a second layer, wherein the second layer is extracted by applying the guided filter for the images, wherein the first layer and the second layer have different characteristics.

10. The apparatus of claim 9, wherein decomposing the image into two or more decomposed images comprises:
performing convolutions for the image to yield the feature maps as input into two or more separate branches of convolution passes.

11. The apparatus of claim 9, wherein generating an HDR image by processing the extracted feature maps comprises:
applying convolution operations on the extracted feature maps through one or more convolution layers.

12. The apparatus of claim 9, wherein generating an HDR image by processing the extracted feature maps comprises:
multiplying outputs of different branches of convolution passes.

13. The apparatus of claim 9, further comprising:
training filter parameters of the convolution operations for image decomposition, feature extraction and HDR image generation.

14. The apparatus of claim 13, wherein training the filter parameters comprises:
  updating the filter parameter values for the convolution operations based on one or more training loss functions.

15. The apparatus of claim 14, wherein updating the filter parameter values for the convolution operations based on one or more training loss functions comprises:
  changing the filter parameter values for the convolutions based on difference signals between predicted HDR image and a ground truth HDR image.

16. The apparatus of claim 9, wherein producing the two or more decomposed images as having different signal components comprises generating the two or more decomposed images by performing edge-preserving filtering on the image.

* * * * *